(12) United States Patent
Krichene et al.

(10) Patent No.: US 11,902,370 B2
(45) Date of Patent: Feb. 13, 2024

(54) SHARED DATA MANAGEMENT SYSTEM

(71) Applicant: COMMISSARIAT A L'ENERGIE ATOMIQUE ET AUX ENERGIES ALTERNATIVES, Paris (FR)

(72) Inventors: Hana Krichene, Gif sur Yvette (FR); Paul Dubrulle, Paris (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/777,273

(22) PCT Filed: Nov. 26, 2020

(86) PCT No.: PCT/EP2020/083456
§ 371 (c)(1),
(2) Date: May 16, 2022

(87) PCT Pub. No.: WO2021/105262
PCT Pub. Date: Jun. 3, 2021

(65) Prior Publication Data
US 2022/0407917 A1    Dec. 22, 2022

(30) Foreign Application Priority Data
Nov. 27, 2019  (FR) ..................... 1913280

(51) Int. Cl.
*G06F 15/167*   (2006.01)
*H04L 67/1097*   (2022.01)
(Continued)

(52) U.S. Cl.
CPC .......... *H04L 67/1097* (2013.01); *G06F 16/22* (2019.01); *H04L 43/0858* (2013.01); *H04L 69/18* (2013.01)

(58) Field of Classification Search
CPC . H04L 67/1097; H04L 43/0858; H04L 69/18; G06F 16/22
(Continued)

(56) References Cited

U.S. PATENT DOCUMENTS

2010/0029278 A1* 2/2010 Fang ................. H04W 36/0055
                                                                    455/436
2012/0131309 A1* 5/2012 Johnson .................... G06F 8/40
                                                                    712/E9.004
(Continued)

FOREIGN PATENT DOCUMENTS

| EP | 1 034 982 A2 | 9/2000 | |
| EP | 1034982 A2 * | 9/2000 | ....... H04L 12/40169 |

(Continued)

OTHER PUBLICATIONS

Dubrulle, et al., "A Data Flow Model with Frequency Arithmetic", International Conference on Fundamental Approaches to Software Engineering FASE 2019: Fundamental Approaches to Software Engineering, pp. 369-385, 2019.

*Primary Examiner* — Liang Che A Wang
(74) *Attorney, Agent, or Firm* — BakerHostetler (57) ABSTRACT

A shared data management system configured to receive frames comprising data from one or more producer devices and to transmit reconstructed frames to one or more consumer devices, a producer device and a consumer device being connected to the shared data management system by way of a communication network using a communication protocol. The shared data management system comprises a memory system having one or more memories. The shared data management system advantageously comprises a central controller configured to store at least some of the data encapsulated in a frame received from a producer device in a target memory area of the memory system, the central controller being configured to compute, for each datum to be (Continued)

stored, the address of the target memory based on an index associated with the datum in the received frame.

15 Claims, 5 Drawing Sheets

(51) Int. Cl.
  *G06F 16/22*  (2019.01)
  *H04L 43/0852*  (2022.01)
  *H04L 69/18*  (2022.01)
(58) Field of Classification Search
  USPC .................................................. 709/216, 223
  See application file for complete search history.

(56) References Cited

U.S. PATENT DOCUMENTS

2014/0334300 A1* 11/2014 Horihata ................. H04L 12/12
                       370/230
2015/0341874 A1* 11/2015 Nguyen-Dang .. H04W 52/0222
                       370/350

FOREIGN PATENT DOCUMENTS

| EP | 1 177 658 A1 | 2/2002 |
|---|---|---|
| EP | 1 034 982 A3 | 12/2003 |
| WO | 00/69127 A1 | 11/2000 |
| WO | 2004/059505 A1 | 7/2004 |
| WO | 2005/122508 A1 | 12/2005 |
| WO | 2006/032750 A1 | 3/2006 |
| WO | 2009/021974 A2 | 2/2009 |
| WO | 2015/145382 A1 | 10/2015 |

* cited by examiner

SHARED DATA MANAGEMENT SYSTEM

CROSS-REFERENCE TO RELATED APPLICATIONS

This application is a National Stage of International patent application PCT/EP2020/083456, filed on Nov. 26, 2020, which claims priority to foreign French patent application No. FR 1913280, filed on Nov. 27, 2019, the disclosures of which are incorporated by reference in their entirety.

FIELD OF THE INVENTION

The invention relates in general to distributed systems, and in particular to a system and a method for managing shared data.

BACKGROUND

Embedded systems, such as vehicles, generally use real-time distributed systems to manage data exchanges between various computing entities of the system, using different communication protocols. Such distributed systems are intended to provide deterministic responses to data transfers within time windows that are reserved by applications embedded in the distributed system.

For example, the computing environment in modern vehicles consists of multiple distributed control units that are integrated and interconnected by way of multiple communication media using various communication protocols. Such protocols are highly dependent on the transmission means that is used and on the targeted software application. Moreover, such embedded systems execute numerous applications, such as for example automatic driving (AD) applications in modern vehicles, which generate new needs and new challenges relating to the transportation and processing of data stemming from sensors (video cameras, radars, lidars, etc.) arranged on the system to measure variables used by the applications.

Such a computing environment is considered to be a mixed-criticality environment, that is to say that it comprises entities that have to comply with an expected behavior considered to be critical and other entities that do not have a guarantee in terms of behavior. Mixed criticality does not ensure timing control as is required by real-time (RT) systems. Timing control is ensured by a distributed system when the system provides correct responses at the appropriate times defined by the critical functionalities of the system. In a distributed computing environment, distributed memories are generally used. However, read or write access operations to such memories are difficult to manage in very large systems. Existing distributed memories furthermore ensure direct access between the computing entities that are connected thereto. However, such access operations do not secure data exchanges, this being a major issue in modern embedded systems (such as for example electric vehicles).

A real-time (RT) distributed system requires notably a guarantee of responses in bounded real time, easy extensibility of the computing environment, heterogeneity of the computing media and their communication protocols, and shared access to resources and data. Moreover, a real-time (RT) distributed system has to guarantee a minimum communication cost while at the same time optimizing bandwidth occupancy and reducing communication delays.

One solution for managing data in a distributed computing environment has been proposed in patent application WO 05950, which proposes a method for sharing data stored in a database. According to this approach, various programs are able to access the database. However, such a solution does not make it possible to transmit, in an autonomous, configurable and deterministic manner, all the data stemming from the various flows of an environment. Moreover, this solution requires the processing of numerous interrupts during the execution of the programs, thereby preventing deterministic responses from being obtained.

Another solution has been proposed in patent application WO032750. WO032750 proposes an RT communication system based on a host structure allowing data to be distributed between two or more equipments constructed with heterogeneous architectures. WO032750 furthermore uses a network gateway in order to interface different networks, the operation of which is clocked over time. However, this solution does not make it possible to process frames of various communication protocols, or to optimize bandwidth. Determinism is ensured only in terms of the requests and not in the end-to-end data transfer paths throughout the system.

In yet another approach, described in patent application WO 021974, a method for real-time data transmission for industrial systems based on implemented Ethernet has been proposed. Such a method consists of a master node and a set of slave nodes, in which a node is able to modify the content of a frame before it is retransmitted to another node, based on a priori knowledge of the structure of the frames. However, the method does not rely on a central memory to store the data to be used to construct new frames. Therefore, a frame may only be modified without causing data disassembly and reconstruction in other frames.

WO 145382 also discloses using an electronic component capable of evolving in a distributed environment so as to act as a gateway between various elements of the environment using different communication protocols, while at the same time providing deterministic responses to requests from these elements. However, in this approach, the transfer of frames is linked only to requests triggered by data consumers.

There is thus a need for an improved system and method for the real-time management of shared data, able to be used in a distributed computing environment.

SUMMARY OF THE INVENTION

The invention aims to improve the situation. To this end, what is proposed is a shared data management system configured to receive frames comprising data from one or more producer devices and to transmit reconstructed frames to one or more consumer devices, a producer device and a consumer device being connected to the shared data management system by way of a communication network using a communication protocol. The shared data management system comprises a memory system having one or more memories. Advantageously, the shared data management system comprises a central controller configured to store at least some of the data encapsulated in a frame received from a producer device in a target memory area of the memory system, the central controller being configured to compute, for each datum to be stored, the address of the target memory based on an index associated with the datum in the received frame.

In one embodiment, one or more samples of one and the same datum are received at various times. The central controller may then furthermore be configured to compute a validity bit for the received datum on the basis of an expiration date associated with the datum, the validity bit being set to a validity value if no preceding sample of the datum, associated with another index, is stored in the memory system.

Advantageously, the central controller is able to detect a delay in receiving data encapsulated in a received frame by comparing the expiration date of the datum to the reception date of the datum.

In one embodiment, the expiration date may be computed based on the index of the datum.

In one embodiment, the shared data management system may comprise at least one configuration data structure storing configuration information associated with the frames, with the data, with the producer devices and with the consumer devices connected to the shared data management system by way of the communication network, the central controller furthermore using information stored in the configuration data structures to determine the address of the target memory.

In particular, at least one configuration data structure may comprise:
- A frame table comprising a list of frames to be sent over the communication network by the shared data management system to consumer devices; and/or
- A sending table comprising a list of the data to be encapsulated in the frames to be sent over the communication network, each datum being identified by at least one datum identifier; and/or
- A control table comprising the information relating to each datum flowing in the communication network, the one or more datum identifiers stored in the sending table representing the access address for accessing the control table.

In one embodiment, the frame table may comprise, for each frame to be transmitted:
- the transmission date of the frame; and
- the reception deadline date for the frame, representing the latest date at which the frame should be received.

The sending table may comprise, for each datum in the list:
- a pair of identifiers; and
- a datum index representing the address of the datum relating to a producer device.

In one embodiment, the control table may comprise:
- an offset parameter for the address of the datum in the memory system; and
- the size of the datum.

Advantageously, the central controller may be configured to compute the target memory address of a datum by additionally using the address offset and the size of the datum stored in the control table.

The target memory address of a datum may be equal to the sum of the address offset and the size of the datum that are stored in the control table.

In one embodiment, the central controller may be configured to construct the frames to be transmitted by grouping the data into the frames on the basis of the target consumer device and the transmission date associated with the frame in the configuration data structures.

The shared data management system may comprise a plurality of memory controllers, acting as interface between the memory system and the central controller, and one or more protocol controllers, acting as interface between the central controller and the producer and consumer devices, each protocol controller being specific to a given protocol.

In one embodiment, the memory system may comprise at least one dedicated memory area associated with a data producer device, the data stored in a given memory area comprising the data produced by the producer device associated with said dedicated memory area.

What is furthermore proposed is a shared data management method implemented in a shared data management system for receiving frames comprising data from one or more producer devices and for transmitting reconstructed frames to one or more consumer devices, a producer device and a consumer device being connected to the shared data management system by way of a communication network using a communication protocol, the shared data management system comprising a memory system comprising one or more memories. The method advantageously comprises a step of storing at least some of the data encapsulated in a frame received from a producer device in a target memory area of the memory system, the method furthermore comprising a step of computing, for each datum to be stored, the address of the target memory based on an index associated with the datum in the received frame.

The embodiments of the invention thus allow real-time management of shared data in a distributed computing environment using different communication protocols while at the same time providing deterministic responses to messages based on data transfer events.

They furthermore provide a solution that may be based on previously configured exchange scenarios while at the same time complying with the time windows provided by the data producer devices and/or the communication network, while at the same time ensuring optimization of bandwidth use.

The embodiments of the invention furthermore allow coexistence between traditional communications based on cyclic messages (such as for example LIN, CAN/CAN-FD and FlexRay) and service-oriented communications consisting of event-based message unicasts and imposed time constraints, so as to guarantee the validity of the produced data, such as IP-based network (for example Ethernet) communications.

BRIEF DESCRIPTION OF THE DRAWINGS

Other features, details and advantages of the invention will become apparent on reading the description, which is given with reference to the appended drawings, which are given by way of example and in which, respectively.

DETAILED DESCRIPTION

Figure 1:
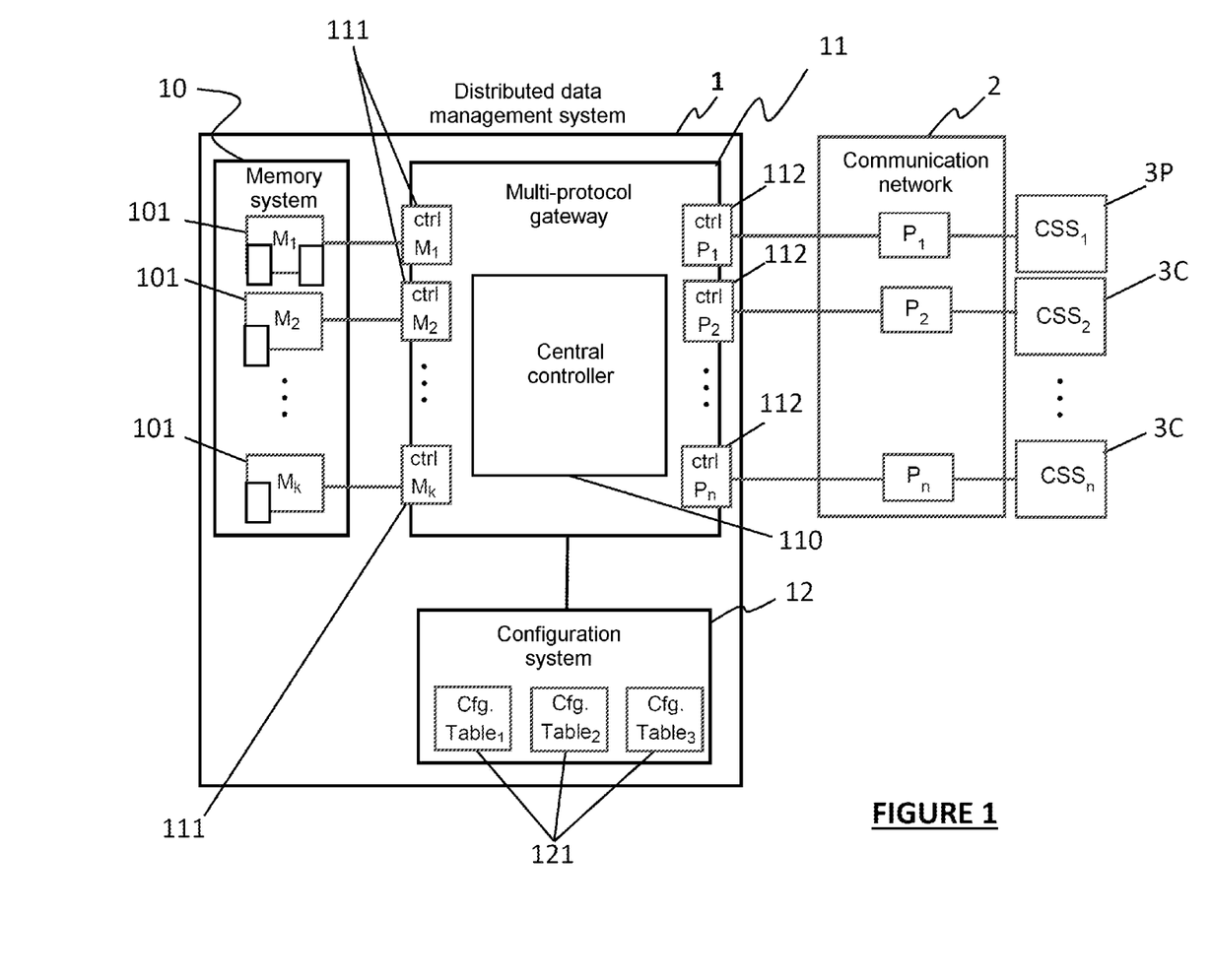
FIG. 1 shows a shared data management system according to some embodiments.

FIG. 1 shows one example of an operational environment 100 of a shared data management system 1, according to some embodiments.

The shared data management system 1 is also referred to below as DSM system (acronym for the corresponding expression "Data Sharing Management").

The shared data management system 1 comprises a memory system 10 comprising a plurality of separate memories that form a shared address space on a logic plane. The address space is shared, that is to say that one and the same physical address on two separate processors points to the same memory location.

The DSM system 1 furthermore comprises a multi-protocol gateway 11 comprising a central controller 110 configured to receive data from one or more external data producer devices 3P via a communication network 2 or to send data stored in the memory system 10 to one or more data consumer devices 3C. The central controller 110 is furthermore configured to extract the data received in a message from a data producer device 3P and, for each extracted datum, to determine a validity bit before storing the extracted datum, in association with the validity bit thus determined, in a memory 101 selected beforehand.

The DSM system 1 may furthermore comprise a configuration system 12 configured to store configuration information associated with the data stored in the memories 101. Advantageously, the central controller 110 may be configured to determine the memory 101 to be selected to store a received datum based on the configuration information associated with the data stored in the memory system 10. The configuration system may store the configuration information in any suitable data structure 121, such as a configuration table. The configuration information may comprise various parameters associated with the data stored in the memory system 10, such as the size or the criticality of the data. The remainder of the description will be given with reference to configuration data structures 121 of configuration table type, by way of non-limiting example.

Such configuration data structures 121 may more generally store any parameter providing prior knowledge about the structure of the workload of the data frames received from the producer devices 3P and the needs in terms of consumption data required by each consumer subsystem 3C connected to the DSM 1 via the communication network 2.

The multi-protocol gateway 11 may be used by various elements of the computing environment 100, regardless of the communication protocol used, while at the same time providing deterministic responses to data transfers defined in configuration tables.

Advantageously, the operation of the DSM system 1 does not depend on the reception of data transmission requests from producer devices 3P to trigger the sending of data to the consumer devices 3C. The DSM system 1 according to the embodiments of the invention uses configuration information describing data transmission scenarios defined in the configuration tables 121. In one embodiment, the configuration tables 121 may be generated automatically through tool-based analysis of a computing model, as described for example in P. Dubrulle, C. Gaston, N. Kosmatov, A. Lapitre, and S. Louise. "A Dataflow Model with Frequency Arithmetic." 22nd International Conference on Fundamental Approaches to Software Engineering (FASE). Cham: Springer, 2019. Such a computing model is an extension of the Synchronous Data Flow (SDF) model format, called a polygraph. For example, in one application of the invention to a computing system embedded in a vehicle, the computing model may be based on the AUTOSAR standard. Such an operating mode based on the prior knowledge of data transmission scenarios makes it possible to secure multi-protocol data transfers while at the same time guaranteeing low latency and a high bandwidth (use of the available bandwidth is thus optimized).

The multi-protocol gateway 11 may comprise one or more protocol controllers 112 (called "Ctrl $P_i$" in FIG. 1), configured to form an interface with the communication network 2.

The multi-protocol gateway 11 may furthermore comprise one or more memory controllers 111 (called "Ctrl $M_i$" in FIG. 1), configured to form an interface with the memory system 10.

The central controller 110 is designed to orchestrate the data exchanges between the various internal elements of the DSM system 1, such as the memory system 10 and the configuration tables 121. The central controller 110 may use a data format common to all of the elements of the DSM 1. The central controller 110 may furthermore use a schedule of the exchanges that is predefined in the configuration system 12.

The DSM system 1 may comprise a timestamping unit 14 (not shown) configured to associate, with each datum received from a producer, a reception date representing the date at which the datum was received by the DSM system 1. In one embodiment, the timestamping unit may be configured to compute a reception date for the datum based on an index corresponding to the datum (multiple samples of one and the same datum may be transmitted by the producer devices, each sample being associated with an index corresponding to a sending time, the indices being incremented on the basis of the sending date of the sample). A first sample of a datum with an index lower than the index of a second sample of the same datum will thus correspond to a transmission time prior to the transmission time of the second sample. However, it may be the case that a sample with a lower index arrives after a sample with a higher index, for example in the event of packet loss. It may also be the case that two samples of one and the same datum are received at consecutive times, while the indices of these samples are not successive (the absolute value of the difference between the two indices is strictly greater than 1), in the event of message loss.

Such indices associated with the received data may be used to determine the validity period of each datum received from a consumer 3C along with the expiry of a datum.

In one embodiment, the validity of a datum (non-expired datum) may be checked at the level of the frame. According to such an embodiment, it is assumed that the producer devices 3P sending the data frames (or data messages) make available only valid data, after having performed a first filtering operation on the data to be transmitted in the communication network 2.

The communication network 2 may include one or more private and/or public networks (for example the Internet) that allow data to be exchanged, such as the Internet, a local area network (LAN), a wide area network (WAN), a cellular voice/data network, one or more high-speed bus connections and/or other types of communication networks of this kind. The network 2 may use communication protocols such as 4G, Ethernet, 802.11, TCP/IP (Transmission Control Protocol/Internet Protocol), HTTP (Hypertext Transport Protocol), FTP (File Transfer Protocol), etc.

The validity test on a datum received in a frame from a producer device 3P may be performed at the level of the frame using a global reception date. The DSM system 1 may use the global reception date to determine whether or not the data making up a data frame (message) received from a producer device 3P are valid (a valid datum is a non-expired datum) with respect to a transmission time window, thereby making it possible to reduce the computational cost of the data management system 1.

The timestamping unit may use a time base that may be derived from a system time, such as for example a system time equal to 10 nanoseconds (ns) encoded on a first set of bits (for example 64 bits) for nanoseconds and on another set of bits (for example 32 bits) for milliseconds. The time base thus makes it possible to provide a common time reference system for all of the elements of the DSM system 1.

The configuration parameters stored in the configuration system 12 may be determined using a communication and computing model (MOCC) based on files describing the flow of data exchanges along with their type in the computing environment, for example which element of the environment produces which datum at which time, and which datum is consumed by which elements at which time.

The DSM system 1 is configured to identify each received datum using identification parameters including a pair of identifiers and a production index. The data identification parameters are associated with each datum received by the central controller 110 before storing the received datum in the memory system 10. The data identification parameters may advantageously be stored in a configuration table of the configuration system 12. The central controller 110 is configured to extract the identification parameters of a datum from the configuration tables 120, and to encapsulate them with the corresponding datum so as to form a DSM frame to be sent to a consumer 3.

The central controller 110 is thus responsible for reconstructing the frames to be sent based on the data stored in the memory system 10 and the configuration parameters associated with the data in the configuration table 121.

Each frame received by the central controller 110 comprises a frame identifier uniquely identifying the frame. In one embodiment, the frame identifier is represented by a reception deadline date $D_{frame}$ (also referred to using the notation "Frame_deadline" in the remainder of the description or in the figures). The reception deadline date $D_{frame}$ corresponds to the latest date at which the frame should be received. Such a frame identifier allows the DSM 1 to check the validity of the frame at reception thereof, a frame received at a time later than the reception deadline date $D_{frame}$ being considered to be invalid.

A frame reconstructed by the central controller 110 also comprises a frame identifier and, for each datum encapsulated in the frame, datum configuration parameters extracted from the configuration tables 121.

Figure 2:
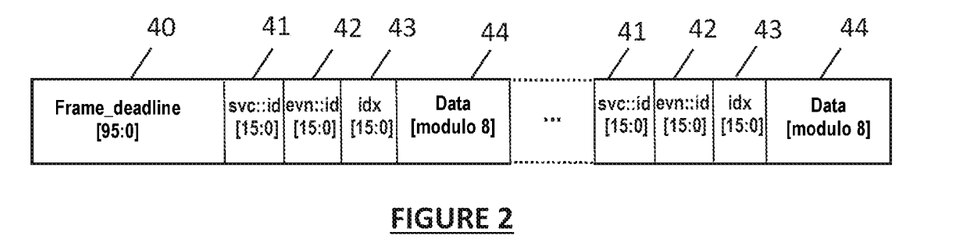
FIG. 2 illustrates the structure of a message received or sent by a shared data management system, according to some embodiments of the invention.

FIG. 2 illustrates one example of a form of frame reconstructed by the DSM 1.

As shown in FIG. 2, a DSM frame comprises:
a field 40 corresponding to the frame identifier $D_{Frame}$, for example placed in the header of the frame;
for each datum 44, configuration parameters for the corresponding datum 41, 42 and 43, placed for example before the datum.

In response to the reception of a frame received from a consumer device 3C by the DSM 1, the central controller 110 is configured to check the validity of the received frame using the frame identifier $D_{Frame}$. If the frame is determined as being valid, for each datum contained in the frame, the central controller 110 is configured to extract the data parameters encapsulated with the datum. The central controller is furthermore configured to compute the address of the datum based on the information provided by the configuration tables and the data parameters associated with the datum in the received frame. The central controller 110 is furthermore configured to store the datum in a memory 101 of the memory system 10 selected based on the computed address.

The memory system 10 may comprise one or more memories 101 of different types. The memories 101 may thus comprise one or more static random access memories (SRAM) and/or dynamic memories, such as for example DDR (Double Data Rate) memories.

In one embodiment, the memory system may for example comprise SRAM memories and DDR memories for storing data produced by servers (producer devices) and consumed by client devices or systems (consumer devices). Using multiple types of memories and computing a data address based on the received data parameters allows client applications (producer devices) to achieve a target bit rate (expected bit rate) defined by each application. For example, large data intended to be used by multiple applications running in various consumer devices (3C) may be stored in the DDR memory by the central controller 110, while smaller, critical data may be stored in the SRAM memory, so as to allow fast access to these data. A critical datum is a datum that should be able to be accessed quickly and at all times.

The DSM system 1 is configured to manage data shared between various consumer and producer devices, which data are intended to be put into circulation in the communication network 2, the exchange of such data being able to use various communication protocols, and the data being able to be stored in various shared memories 101.

The DSM system 1 advantageously implements shared data management that uses information received beforehand about the structure and the scheduling of the data making up the network frames, as defined in the configuration tables 121.

The DSM system 1 may furthermore use an abstract scheduling model to determine, for any datum, the period within which the datum should be produced, the period within which it should be consumed and the recipient consumer (consumer who will consume the datum). Such production period, consumption period and target consumer information may then be applied to a tool based on a communication and computing model (MOCC), such as the model by P. Dubrulle, C Gaston, N. Kosmatov, A. Lapitre, and S. Louise. "A Dataflow Model with Frequency Arithmetic." 22$^{nd}$ *International Conference on Fundamental Approaches to Software Engineering (FRSE)*. Cham: Springer, 2019, to generate the configuration tables 121.

In one embodiment, the configuration tables 121 may comprise:
a frame table 1210,
a sending table 1211, and
a control table 1212.

Figure 3:
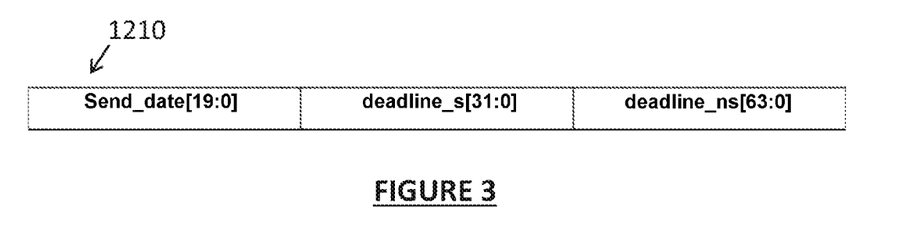
FIG. 3 shows one example of a frame table, according to one embodiment.
Figure 4:
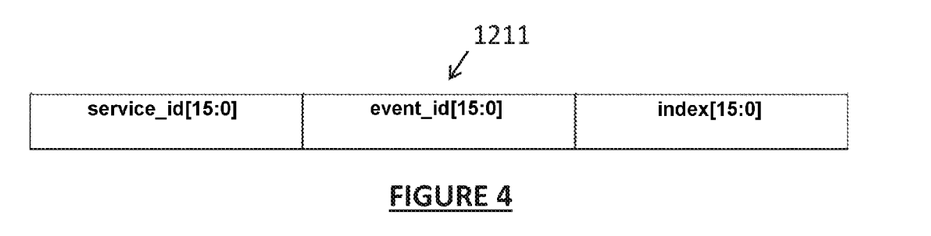
FIG. 4 shows one example of a sending table, according to one embodiment.
Figure 5:
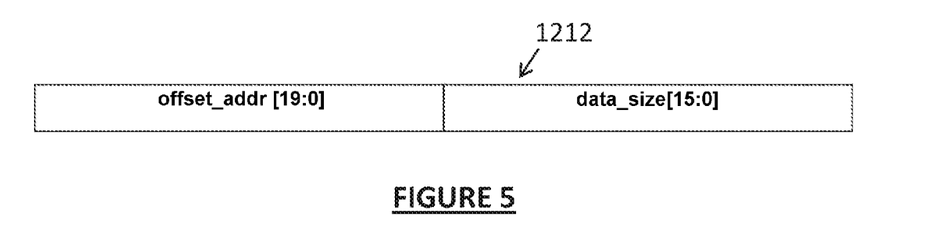
FIG. 5 shows one example of a control table, according to one embodiment.

FIGS. 3 to 5 show examples of frame tables, sending tables and control tables.

As shown in FIG. 3, a frame table 1210 contains a list of the various frames to be sent over the communication network 2 by the DSM 1 to consumer devices 3C. In one exemplary embodiment, the frame table 1210 may list up to 256 frames. The access address for accessing the frame table 1210 may be managed using a counter that is incremented automatically when the execution of the DSM 1 is launched. The frame table 1210 may comprise a set of information relating to the frame and notably:
The transmission date of the frame (send_date): the transmission date of the frame may be used to encapsulate multiple data from various services in one and the same frame, thereby making it possible to saturate the bandwidth. The transmission date of the frame is consistent with the availability of the target consumer equipment at reception and the transmission time required in the communication network.

The reception deadline date for the frame to be sent, which comprises two fields: a field (deadline_s) that corresponds to the value of the date for seconds "deadline_s" encoded on a set of bits (32 bits for example), and a field "deadline_ns" that corresponds to the value of the date for nanoseconds (deadline_ns), encoded on another set of bits (64 bits for example). Beyond the deadline reception date defined by the two fields "deadline_s" and "deadline_ns", a received frame will be considered to be obsolete.

FIG. 3 illustrates one example of a sending table 1211, according to one embodiment.

The sending table 1211 comprises a list of the data making up the frames to be sent over the communication network 2. In one exemplary embodiment, the sending table 1211 may define up to 4096 data to be integrated into the frames.

In the sending table 1211, each datum is associated with datum identification parameters comprising:

A pair of identifiers {service_id, event_id} comprising a first datum identifier "service_id" and a second datum identifier "event_id", which make it possible to access the control table 1211 for all of the data. As used here, a service refers to a logical combination of zero or more events. The events provide data that are sent to consumers cyclically or when the data producer changes. The pair of datum identifiers may be encoded on a set of bits in order to identify N data (for example 32 bits in order to identify $4 \times 10^9$ data);

A datum index representing the number of the data sample relating to a producer service/event 3. The datum index may be encoded on a set of bits (for example 16 bits for addressing $65 \times 10^3$ samples for a datum).

FIG. 5 shows one example of a control table 1212, according to one embodiment.

The control table 1212 defines the information relating to each datum flowing in the communication network 2. The control table 1212 may comprise information relating to the N data of variable size (in the example where $N=4\times10^9$, the size may reach at most $65 \times 10^3$ bytes). The pair of datum identifiers stored in the sending table 1211 represents the access address for accessing the control table.

The control table 1212 may comprise control information and notably:

The offset of the address of the datum in the memory system 10 ("offset_addr");

The size of the datum to be written to or read from the memory system ("data_size"). The size "data_size" may be defined modulo 8 for a data division consistent with the structure of the memories 101 used.

In one embodiment, the central controller 110 of the DSM 1 may compute the effective memory address of the datum based on the address offset "offset_addr", the datum index and the size of the datum.

Advantageously, in order to take account of the criticality of the information in the configuration tables and its impact on the scheduling and security of communications, access to the information in the configuration table does not require any data security process, while the access time to these data may be limited and relatively fast. By storing the configuration tables 121 in separate storage structures of a different type from the memories 101 of the memory system 10 that store the payload data. The configuration tables 121 may for example be stored in a Flash, SRAM or SDRAM memory.

In the multi-protocol gateway 11, the protocol controllers 112 and the memory controllers 111 may be implemented or instantiated based on components relating to a particular protocol (for the protocol controllers 112) or to a particular memory model (for the memory controllers 111).

A protocol controller 112 is associated with a given protocol and may comprise a network interface able to intercept the data of this same protocol. The communication protocol may be any protocol, such as for example the Ethernet, TSN, PCIe, CANFD, etc. protocol. A protocol controller 112 may furthermore comprise a user interface able to communicate with the central controller 110 in order to provide and receive the data in a single form. The central controller 110 is furthermore configured to manage communication problems, by implementing a data transformation operation such as data segmentation, making the data consistent with protocols, decoding or appropriate formatting of the data.

A memory controller 111 is configured to manage transactions based on the user interface, which communicates with the central controller 110, and generate transactions to and from a target memory 101. The memory controller 111 is configured to take responsibility for and to update the memory synchronization parameters, and to fuse write and read transactions in order to reduce the number of dead cycles involved in a bus reversal. The memory controller 111 also reorganizes the commands in order to improve the use of the data bus to the memory 101.

The central controller 110 is advantageously configured to operate in real time. The central controller 110 makes it possible to establish a link, in real time, between the memory system 10 storing the data by way of the memory controllers 110 and the communication network 2 to which one or more computing subsystems 3 (consumer and producer devices) are connected by way of protocol controllers 112.

The central controller 110 is independent of the communication medium that is used.

In one embodiment, the DSM 1 may comprise a supervisor device (not shown), configured to supervise the operation of the central controller 110 and notably supervise the launch, suspension or reinitialization of the execution of the central controller 110. The supervisor may also be configured to control the operating state of the central controller 110 by performing a real-time read operation on a state register of the central controller 110. Such a register may comprise information relating to the state of the central controller 110, along with error reports regarding the writing and reading of the data. The supervision performed by the supervisor of the central controller 110 makes it possible to implement operational security mechanisms.

In one embodiment, the central controller 110 may be parameterized to adapt it to the heterogeneity of the communication media and the memories 101 connected thereto. Depending on the communication medium that is used, the network frames may be processed separately in the central controller 110 by implementing parallel payload data flow processing processes. The configuration tables 121 may be distributed between the various parallel payload data processing processes, so as to ensure parallel and fast access to the configuration information.

The memory system 10 may use an interconnect core to connect multiple AXI (Advanced eXtensible Interface) data paths, which may vary from one another in terms of data width and clock domain. Such an interconnect core may comprise a path selection entity, which makes it possible to select a data path between the protocol controller 112 and the memory controller 111 on the basis of selection criteria such as priority and/or alternate arbitration. Such an interconnect core allows management of concurrent access operations to the various memories 101 of the storage system 10, while at the same time avoiding congestion between the data flows.

Depending on the needs of the computing environment 100, the central controller 110 may evolve without it being necessary to interrupt or modify its operation. For example, the addition of a new communication equipment or a subsystem 3 to the computing environment 100 requires only the duplication of a data management path relating to this new equipment and/or the addition of information relating to the new equipment to the configuration tables 121 in order to integrate the data required by the new services provided by the new equipment.

The embodiments of the invention offer a temporal guarantee of access to the data distributed in the computing system (a vehicle for example). Even in the event of loss or a malfunction of communicating elements, a corrupted or delayed datum cannot be accessed illegally. This results in very good reliability of the DSM system 1.

By using a storage structure forming a centralized database shared by the computing environment 100, the DSM system 1 furthermore ensures the security of communications by limiting direct transactions between computing units (producer and consumer devices). The transactions themselves are secure: the various consumer equipments connected to the network 2 do not need to know the data producer devices 3P or the location of the data producer devices. Access operations to data by consumers are filtered, with minimal rights to the payload data.

Depending on the communication medium, the network frames may be processed separately in the central controller 110, thereby allowing parallel data flow management. The configuration tables 121 may be distributed between the various payload data management stages, so as to ensure parallel and fast access to the configuration data.

In response to the extraction of a datum from a frame received by the DSM 1 from a producer 3, the central controller 110 is able to check the validity of the datum using the pair of datum identifiers associated with the datum in the configuration tables 121. The configuration tables 121 furthermore provide a set of configuration parameters such as the size of the datum, its location in the memory system 10, the criticality of the datum and its production periodicity. On the basis of such configuration information associated with the datum, the central controller 110 is able to determine whether the datum should be stored or erased, thereby making it possible to filter expired data. In response to the processing of a frame by the central controller 110, a success or failure notification may be sent to the supervisor of the central controller.

The DSM system 1 is able to store at least some of the received data in a frame after prior processing of the data in the memory system 10 along with the parameters associated with the data in configuration tables separate from the memories 101 and to retransmit, in real time, data according to different communication protocols to various consumer devices 3C (for example computing subsystems and interface cards), taking into account a service-oriented scheduling defined in the configuration tables. In one exemplary application of the invention to a motor vehicle, the producer devices 3P and the consumer devices 3C may for example be various elements distributed in the vehicle and connected to the communication network 2.

Upon reception of a frame, the DSM system 1 is configured to determine whether the received frame is temporally valid using the frame identifier $D_{Frame}$ encapsulated in the frame. If the frame is valid, the payload data (application data) are extracted from the frame. For each extracted datum, the DSM 1 is configured to determine whether the datum is valid using the data information stored in the configuration tables 121. The check on the validity of a received datum corresponding to a datum sample associated with an index consists in determining whether a previous sample of the same datum associated with another index and already stored in memory 10 has not yet been consumed by a producer device. Such processing is independent of the communication protocol used between the various devices connected to the communication network 2.

If the datum is valid, the target memory 101 in which the datum should be stored is determined using a datum address computed based on the configuration information. The DSM 1 then stores the datum in the target memory.

The DSM 1 is also configured to group the data stored beforehand into the memory system 10, before constructing the frames to be sent to the producer devices 3.

The grouping method, which may be implemented by the central controller 110, uses such data stored in the memory system 10 of the DSM 1 to construct one or more frames intended to be transmitted to consumer devices 3C, the reconstructed frames comprising application data to be consumed by one or more recipient consumer devices 3 connected to the communication network. The application data to be embedded in each frame are determined in configuration tables.

The DMS 1 is furthermore configured to transmit the reconstructed frames, in real time, to one or more consumer devices 3 configured to consume the data encapsulated in the frames, according to some embodiments. For each reconstructed frame, the real time availability of the frame is checked. The frame to be transmitted is then sent in the communication network 2 within transmission time windows defined by the communication network 2. The time at which the frame is sent in the network 2 may be defined in configuration tables.

Figure 6:
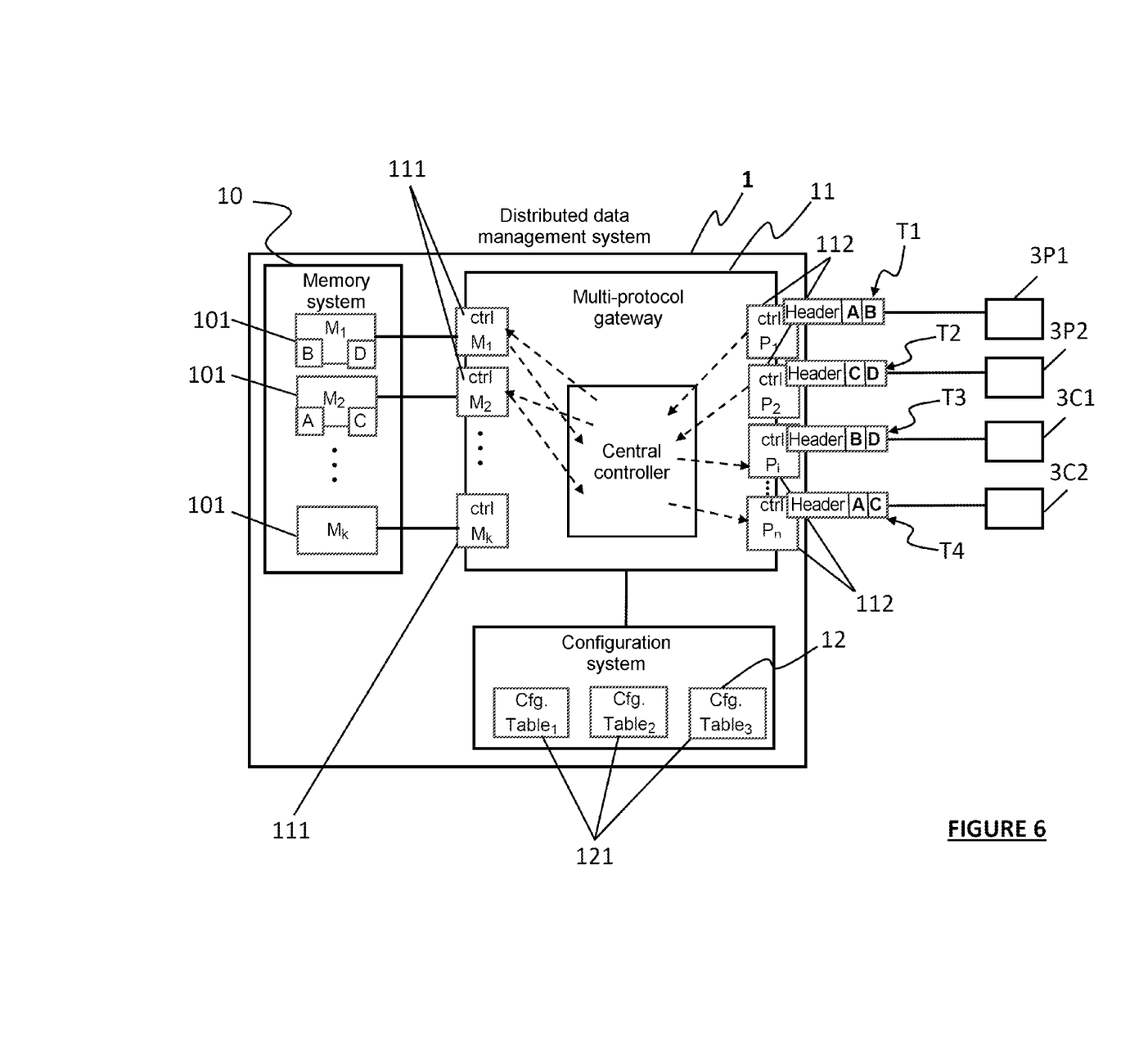
FIG. 6 shows one exemplary implementation of the shared data management system according to some embodiments.

FIG. 6 shows one exemplary implementation of the DSM system 1 according to some embodiments. In the example of FIG. 6, two network frames T1 and T2, respectively from a first producer equipment 3P1 (not shown) via a protocol P1 and from a second producer equipment 3P2 via the protocol P2, are received by the DSM system 1. The received frame T1 comprises application data A and B, while the frame T2 comprises application data C and D. According to a scheduling defined in the configuration tables 121, an equipment 3C1 consumes the data A and C, while an equipment 3C2 consumes the data B and D. The DSM system 1 determines the validity of the received frames T1 and T2 using the received identifier of $D_{Frame}$ along with the validity of the data A, B, C and D. The DSM system 1 then extracts the application data A, B, C and D in order to store them in memories 10, the address of which is computed beforehand on the basis of configuration parameters stored in the configuration tables 121. The DSM system then implements the grouping method to construct a first frame comprising the grouped data A and C intended to be sent to the consumer equipment 3C1 and a second frame comprising the grouped data B and D intended to be transmitted to the consumer equipment 3C2.

The DSM system 1 according to the embodiments of the invention may wait for a waiting time before constructing network frames that will be transmitted to a consumer equipment, until it has a predefined number of data from among the data useful to a recipient equipment. The waiting time may be fixed, predefined or computed before the execution of the real-time distributed computing environment 100, taking into account end-to-end time constraints specified for all of the data flows. This results in an optimization of bandwidth use. In particular, packaging a plurality of data having close retransmission times in one and the same frame avoids constructing and transmitting multiple smaller frames.

In a service-oriented distributed computing environment 100, a new equipment may be added to the computing environment without disrupting the operation of the DSM 1. In particular, the data useful for this new equipment may be specified in the configuration tables 121 without it being necessary to modify the DSM system 1 or other elements of the system. The configuration tables 121 may be updated in order to integrate the information relating to the data useful to the new consumer equipments. Advantageously, the DSM system 1 is able to process (reception/transmission) data transactions by transparently integrating the information relating to the data useful to any new (consumer and/or producer) equipment into the computing environment 100. Moreover, the various equipments 3 connected to the communication network 2 do not require any prior knowledge of the data producer devices or their location.

To provide the performance needed for the computing environment (time control, low latency, etc.), the DSM system may be implemented physically on a programmable integrated circuit such as an FPGA (acronym for "Field Programmable Gate Array") circuit. The data may be kept consistent within the DSM system 1 for example by pre-loading data from the equipments in the computing environment 100 at regular intervals and autonomously. In one exemplary application of the invention to the automotive sector, the producer equipments may include for example sensors and the consumer equipments may include actuators. All of the communications between the producer and consumer equipments (sensors and actuators for example) may pass through a single memory system 10, thereby providing a unified view of the memories 101 accessible to all of the computers.

The DSM system 1 advantageously has a modular architecture consisting of the multi-protocol gateway 11, the memory system 10 comprising one or more heterogeneous memories 101, and the configuration system 12 comprising the three configuration tables (frame table, sending table and control table). The multi-protocol gateway 11 itself comprises multiple sub-modules, which include the n protocol controllers 112, the k memory controllers 111 and the central controller 110.

At the level of the data paths, the protocol controllers 112 are configured to check the received frames with respect to characteristics of the protocol of the transmission medium and to channel the valid frames through the central controller 110. The central controller 110 is able to check the validity of each received frame with respect to the locally configured time base and then to determine the target location of the received data in the memory system 10 based on data parameters stored in the configuration tables 121, such as for example the size and the criticality of the data. The memory controllers 111 are intended to open up access to the memories 101 of the memory system 10 and to store at least some of the received payload data in a target memory 101 of the memory system 10.

Moreover, based on the data stored in the memory system 10, the central controller 110 is configured to construct new frames to be transmitted to the consumer devices, by grouping the data beforehand into the frames to be transmitted on the basis of a scheduling predefined in the configuration tables 121. The reconstructed frames are then sent to the protocol controllers 112 so as then to be sent to the consumer devices 3C of the computing system 100 via the communication network 2.

Multiple samples of one and the same datum, each sample corresponding to a given index, may be received at various times by the DSM system 1. Each sample of a datum is associated with one or more sample parameters characterizing the sample. In one embodiment, the sample parameters comprise:

the pair of datum identifiers {service_id, event_id} representing a service of a producer device 3,
a sample index ("index") representing the provision rank of the datum sample by the producer, and
a validity bit ("valid") representing the availability and the validity of the datum sample.

For each pair of datum identifiers {service_id, event_id}, the DSM 1 defines a buffer T configured to store the sample index and the validity bit {"index", "valid"}. The size of the buffer T may be defined offline on the basis of the number of samples produced by each service of a producer device and on the basis of the application requirement. For example, for a fixed size of the sample index encoded on 16 bits, an 8 KB buffer may be used for each {"index", "valid"} pair.

The data from various services of a producer device may be updated by each corresponding service of the producer device. In such an embodiment, dedicated memory areas (also called "memory blocks") may be allocated in each memory 101 of the storage system 10, each area being intended to store all of the samples of one and the same service of a producer device. For example, a memory 101$k$ of the memory system 10 may be subdivided into p memory areas, p designating the number of producer services associated with the memory 101$k$ (the data from these p services will be stored in the memory 101$k$). A datum sample produced by a service i of a producer device 3P will thus be stored in the memory block corresponding to the service i in a memory 101, and may be modified only by the same producer service. However, such a datum sample from a producer service i may be consumed by any consumer device (client device) connected to the DSM 1 via the communication network 2.

The validity bit may have a first binary value indicating that the bit is activated or a second binary value indicating that the bit is deactivated. In one embodiment, in response to the reception of a frame by the DSM 1, it is determined whether or not the validity bit of a datum sample is activated. If the validity bit is deactivated, access to the memory area associated with the sample in the memory system 10 is in write mode (the datum sample may be "written" to the memory area). Otherwise, if the validity bit is activated, write access to the memory area corresponding to the sample is prohibited in order to prevent a valid datum sample in the memory area, which has not yet been consumed, from being overwritten by another sample of the same datum.

During the transmission of a frame, only the memory areas corresponding to data samples associated with activated validity bits (therefore having the first binary value) are accessible in read mode. The configuration tables 121 may advantageously comprise event-based scheduling information in order to avoid the reception of a new sample of a datum before the consumption of a previous sample that is still valid, and/or the triggering of the construction of a frame associated with payload data to be encapsulated in the frame that might not yet be valid. An error message may be sent to the supervisor of the central controller 110 in order to suspend the operation of the central controller 110, recompute the production, overflight and analysis times of each datum sample and then generate new configuration tables.

Each service of a data producer device may thus modify a memory area associated therewith in the memory system 10. Furthermore, the DSM 1 guarantees that access of a consumer device is not concurrent with that of the producer device. The data exchanged by the DSM system 1 are thus secured.

Figure 7:
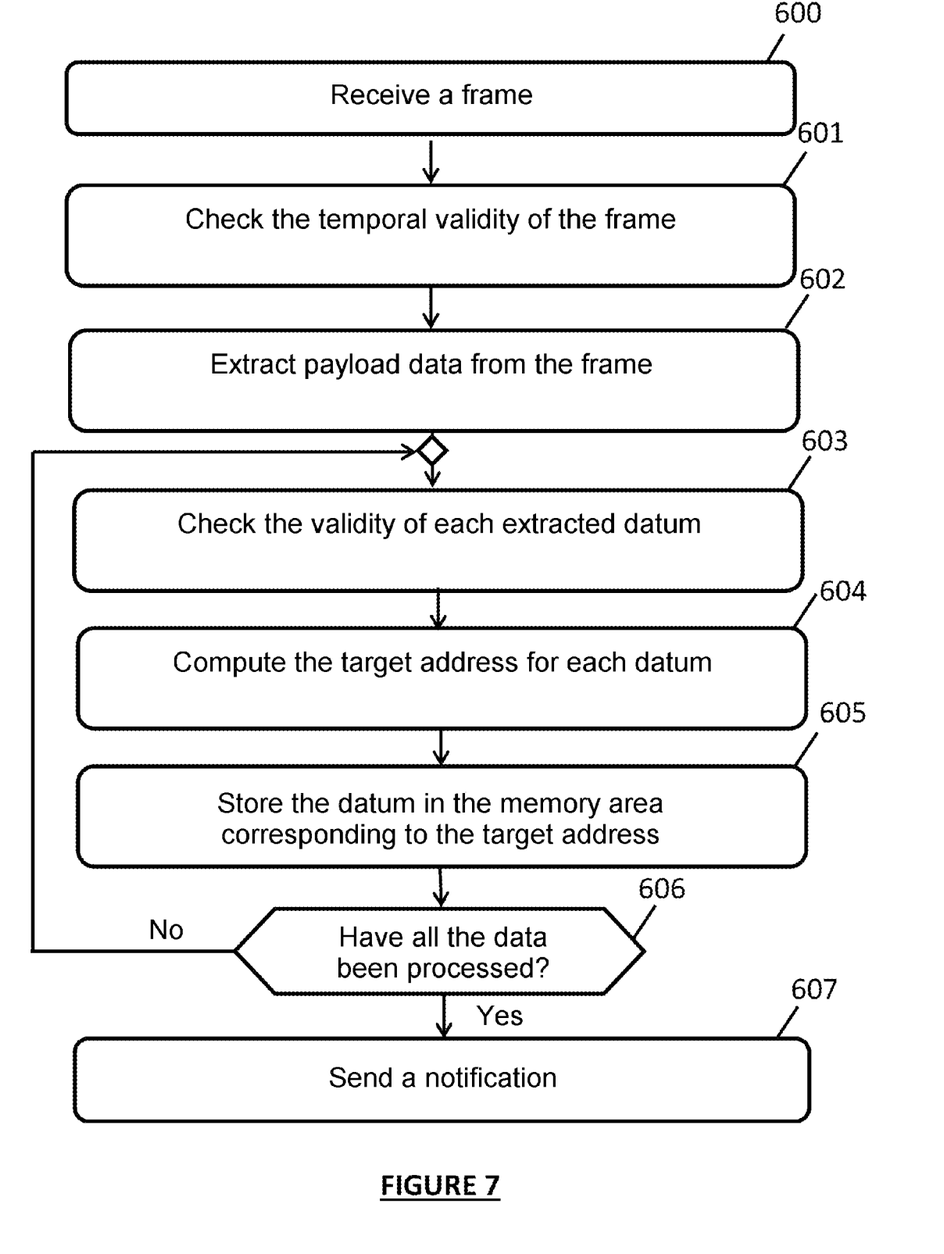
FIG. 7 is a flowchart showing the data reception method, according to some embodiments.

FIG. 7 describes the method for receiving a frame, implemented by the DSM 1 according to some embodiments.

In step 600, a data frame is received from a producer 3.

In step 601, it is determined whether the received frame is temporally valid using the frame identifier $D_{Frame}$ encapsulated in the frame.

In step 601, prior to the check on temporal validity of the frame, it may furthermore be determined whether or not the received frame should be processed by the centralized controller using information indicating the network frames that the DSM 1 should receive, along with information indicating a correspondence between the network frames and the producer devices. For example, in this preliminary step, it may be checked whether the received frame has actually been transmitted by the correct producer device, that is to say the producer device intended to transmit this frame.

In one embodiment, step 601 may furthermore comprise, prior to the check on temporal validity of the received frame, a step of determining whether all of the data or a subset of the data of the frame received by the DSM 1 may be redirected directly to the communication network 2 without having first been stored in the memory system 10. In this embodiment, such data or such a subset of data are redirected directly to target consumer devices. Such an embodiment makes it possible to accelerate the retransmission of the data received by the DSM component 1, for example in cases where time constraints applied to such data are incompatible with storage of these data in the memory system 10 of the DSM system 1.

In step 602, if the frame is valid, the payload data (application datum) are extracted from the frame.

In step 603, for each extracted datum, it is determined whether the datum is valid using the data information stored in the configuration tables 121. It should be noted that step 603 is independent of the communication protocol used between the various entities connected to the communication network 2.

In step 604, if the datum is valid, the target memory 101 in which the datum should be stored is determined using a datum address computed based on the configuration information.

In step 605, the datum is then stored in the target memory.

Memory transfers may be triggered in order to implement the storage of the data in the memory system 10, in accordance with a predefined memory mapping, using the configuration information stored in the configuration tables 121. The configuration tables 121 comprise information allowing the DSM 1 to have static knowledge of the received frames and their structure.

In step 604, the memory address corresponding to the target memory block of the storage system 10 in which the datum under consideration should be stored may be computed based on the datum index (sample index "index") associated with the datum. In one embodiment, the target memory address "address_write" of the memory system 10 of the DSM system 1 is computed based on the datum index "index" using the following equation (1):

$$\text{address\_write} = \text{offset\_addr} + \text{index} * \text{data\_size} \quad (1)$$

In equation (1), the parameter "offset_addr" denotes the address of the buffer T storing the sample index and the parameter "data_size" denotes the size of the sample.

In step 605, access to the target memory corresponding to the target memory address may be opened up by the corresponding memory controller 111 in order to allow the storage of each datum under consideration in the memory area allocated thereto (which may be for example the area dedicated to one and the same service of a producer device).

Steps 603 to 605 may be reiterated for each extracted datum to be stored in the memory system 10 until all of the data of the received frame have been processed (step 606).

In step 607, a notification may be sent to a software supervisor (for example by the central controller 110) in order to notify it of the end of the data transfers between the protocol controller 112 and the memory controller 111 of the multi-protocol gateway 11 of the DSM system.

Figure 8:
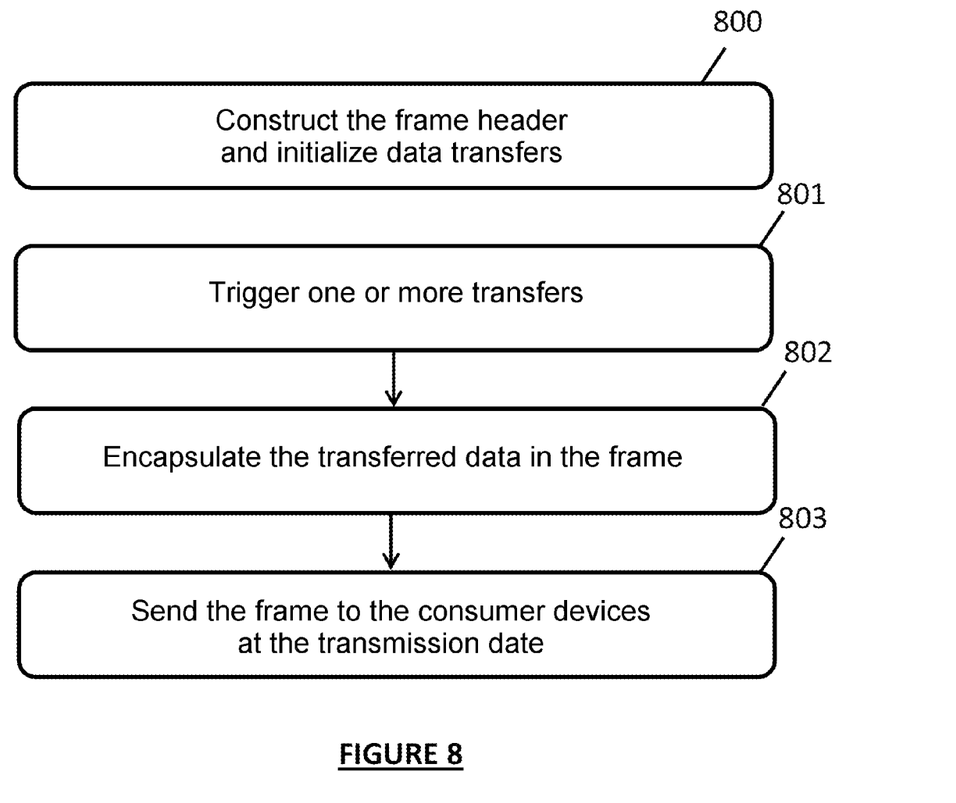
FIG. 8 is a flowchart showing the method for sending data stored in the memory system, according to some embodiments.

FIG. 8 shows the real-time frame transmission method implemented by the central controller 110 of the DSM system 1 in order to transmit the reconstructed frames, according to some embodiments. The frames are transmitted to one or more recipient consumers 3C intended to consume the data encapsulated in the frames.

The frame transmission method is implemented in order to construct and transmit frames taking into account event-based scheduling information stored in the configuration tables 121 in order to determine the data to be grouped into the frames, the transmission time of the data samples, and the target consumer devices 3.

In step 800, the header of the frame to be transmitted is constructed. Moreover, in step 800, read requests are transmitted in order to initiate data transfers from the memory system 10 to the corresponding protocol controller 112 of the DSM system 1 before the frame is transmitted. In step 800, frame information stored in the configuration tables 121 providing information relating to the frames to be transmitted and frame structure information may be used.

In step 801, one or more memory transfers from among the memory transfers initiated in step 800 are triggered. The memory transfers that are triggered transfer one or more data to be included in frames from the memory system 10 to the central controller 110 of the DSM system 1. Such data will form the application part (44) of the network frame. Depending on the number of data to be transferred from the memory system 10, step 801 may be reiterated until the application part of the network frame to be transmitted is fully constructed (step 802).

In response to the detection of the end of the memory transfers, the frame to be transmitted is made available to be sent by the corresponding protocol controller 112 to a consumer device, if the protocol controller is available. In some embodiments, if the protocol controller is blocked for a predefined period of time, the frame may be rejected. The availability of the protocol controller 112 may depend on the availability of the target consumer device (the availability of a protocol controller may be activated in response to an availability signal received by the target consumer device). In step 803, the protocol controller triggers the transmission of the frame at the transmission date ("Send Date") associated with the frame in the configuration tables 121.

Network traffic monitoring may be implemented during frame transmission and/or frame reception by the DSM system 1.

In one embodiment, it is possible to determine the maximum delay Δmax between the production of a new datum sample (corresponding to a given index) and the making available of this sample in the memory system 10.

The maximum delay Δ'max between an access request for accessing a datum, from the memory system 10, and the making available of the datum to a consumer device 3C, may also be computed.

The delay Δmax and/or the delay Δ'max may be computed based on the reception/transmission times of the network frames between a protocol controller 112 of the DSM system 1 and the memory system 10, these times being dependent on the internal architecture of the DSM system 1.

In one embodiment, it may be checked whether the end-to-end transmission constraint for a datum is satisfied. In particular, it may be checked whether such a constraint is satisfied by determining whether the sum of the maximum time delays involved in the various steps of routing a service datum from a producer device 3P to the target consumer devices 3C is less than a threshold value representing the end-to-end time constraint, such a threshold taking into account the time behaviors of the various transmission media of the communication network 2.

The embodiments of the invention thus provide a DSM system 1 equipped with various types of network controller 112 (for example a CAN controller, a PCIe controller, a TSN/Ethernet controller, etc.) in a single physical medium. The data are advantageously stored in the memory system 10 independently of the stages of parallel management of the various data flows, thereby offering unified access to the data for all of the devices (equipment, subsystem) connected to the communication network 2 in the computing system 100. The DSM 1 advantageously allows processing of the data received in the frames from the producer devices 3P that satisfies a predefined scheduling in the configuration system 12. The DSM system according to the embodiments of the invention therefore forms a multi-protocol transmission system, which may be used in any service-oriented RT distributed computing environment, in which data received from a producer device 3P via a given protocol may be retransmitted via another protocol to a consumer device 3C, without the consumer device 3C requiring knowledge of the datum producer device (thereby increasing the security of the shared data). Advantageously, the transmission of the stored data may be triggered only when at least one recipient consumer device of the network 2 needs such data, thereby avoiding congesting the network 2 and all of the nodes (producer devices) connected to the network 2.

The DSM system 1 according to the embodiments thus allows a deterministic data exchange that guarantees control of signal propagation times, data transmission latencies, and data processing time, while at the same time ensuring a high level of security for the data stored in the memory system. The DSM system 1 is particularly suitable for critical applications, requiring fast access to data at all times.

The embodiments of the invention furthermore make it possible to optimize bandwidth use deterministically by packaging, in one and the same frame, data having close retransmission times, received from potentially different communication protocols. In particular, by avoiding constructing and transmitting multiple smaller frames, the bandwidth used for the protocol headers in the packets is optimized.

The embodiments of the invention make it easier to add equipments to the system, the data useful for a new equipment being able to be available directly on the DSM system 1 itself, without requiring modifications to the other equipments.

The DSM system 1, along with the frame reception method according to the embodiments, may furthermore detect any deadline violation in the access operations to the shared data, such violations possibly for example stemming from packet losses on the connected networks, or else delays at transmission or at reception by the software components. For example, a loss of a packet may be detected by comparing the indices of the samples received by the DSM 1 for each datum, after extracting the datum from the received frame. A delay in receiving data may be detected by comparing the expiration date of the datum with the reception date. The expiration date of the datum may be computed on the basis of the index associated with the datum.

In one exemplary embodiment, the expiration date of a sample may in particular be determined by comparing:
    the product P of the index of the sample and the production period of the samples of one and the same datum, with
    a time window provided by a local time counter.

The DSM system 1 is thus able to guarantee the security and efficiency of transactions, by detecting deadline violations as early as possible, and by preventing propagation of erroneous access operations, which prevents other consumer devices from being impacted and the bandwidth from being used to transmit expired data.

Those skilled in the art will understand that the systems or subsystems according to the embodiments of the invention may be implemented in numerous ways by hardware, software or a combination of hardware and software, notably in the form of program code that may be distributed in the form of a program product, in numerous forms. In particular, the program code may be distributed using computer-readable media, which may include computer-readable storage media and communication media. The methods described in the present description may notably be implemented in the form of computer program instructions able to be executed by one or more processors in an information technology computer device. These computer program instructions may also be stored in a computer-readable medium.

Moreover, the invention is not limited to the embodiments described above by way of non-limiting example. It encompasses all of the variant embodiments that may be contemplated by those skilled in the art. In particular, those skilled in the art will understand that the invention is not limited to the exemplary protocols cited by way of example in the description above, and may include other types of protocols. Moreover, those skilled in the art will understand that the invention is not limited to the exemplary computing systems mentioned in the description above. The DSM system 1 according to the embodiments of the invention may be integrated into any computing environment or system in which data are produced by producer devices connected to a communication network and consumed by consumer devices connected to this same communication network. Examples of computing systems include, without limitation, environments intended for the automotive, aerospace or defense industry.

The invention claimed is:

1. A shared data management system configured to receive frames comprising data from one or more producer devices and to transmit reconstructed frames to one or more consumer devices, a producer device and a consumer device being connected to the shared data management system by way of a communication network using a communication protocol, the shared data management system comprising:
- a memory system comprising a plurality of separate memories forming a space of shared addresses, wherein the shared data management system comprises a central controller configured to store at least some of the data encapsulated in a frame received from a producer device in a target memory of the memory system;
- one or more samples of a same datum being sent by the producer device, each sample of datum being associated with an index corresponding to a time of sending the sample, the indexes being incremented as a function of the date at which the sample is sent by the producer device; and
- the central controller being configured to compute, for each datum to be stored, an address of the target memory based on the sample index associated with the datum in the received frame, determine whether the datum is valid using data information from the received frame or stored in configuration tables, and store the datum in the address of the target memory.

2. The shared data management system as claimed in claim 1, wherein the central controller is furthermore configured to compute a validity bit for received datum on a basis of an expiration date associated with the datum, said validity bit being set to a validity value if no preceding sample of the datum, associated with another index, is stored in the memory system.

3. The shared data management system as claimed in claim 2, wherein the central controller is able to detect a delay in receiving data encapsulated in a received frame by comparing the expiration date of the datum to a reception date of the datum.

4. The shared data management system as claimed in claim 2, wherein the expiration date is computed based on the index of the datum.

5. The shared data management system as claimed in claim 1, comprising at least one configuration data structure storing configuration information associated with the frames, with the data, with the producer devices and with the consumer devices connected to the shared data management system by way of the communication network, the central controller furthermore using information stored in said configuration data structures to determine the address of the target memory.

6. The shared data management system as claimed in claim 5, wherein said at least one configuration data structure comprises:
- a frame table comprising a list of frames to be sent over the communication network by the shared data management system to consumer devices; and/or
- a sending table comprising a list of the data to be encapsulated in the frames to be sent over the communication network, each datum being identified by at least one datum identifier; and/or
- a control table comprising the information relating to each datum flowing in the communication network, the one or more datum identifiers stored in the sending table representing an access address for accessing the control table.

7. The shared data management system as claimed in claim 6, wherein the frame table comprises, for each frame to be transmitted:
- a transmission date of the frame; and
- a reception deadline date for the frame, representing the latest date at which the frame should be received.

8. The shared data management system as claimed in claim 6, wherein the sending table comprises, for each datum in the list:
- a pair of identifiers; and
- a datum index representing the address of the datum relating to a producer device.

9. The shared data management system as claimed in claim 6, wherein the control table comprises:
- an offset parameter for the address of the datum in the memory system; and
- a size of the datum.

10. The shared data management system as claimed in claim 9, wherein the central controller is configured to compute a target memory address of a datum by additionally using the address offset and the size of the datum that are stored in the control table.

11. The shared data management system as claimed in claim 9, wherein a target memory address of a datum is equal to a sum of the address offset and the size of the datum that are stored in the control table.

12. The shared data management system as claimed in claim 5, wherein the central controller is configured to construct the frames to be transmitted by grouping the data into the frames on a basis of a target consumer device and a transmission date associated with the frame in the configuration data structures.

13. The shared data management system as claimed in claim 1, comprising a plurality of memory controllers acting as interface between the memory system and the central controller, and one or more protocol controllers acting as interface between the central controller and the producer and consumer devices, each protocol controller being specific to a given protocol.

14. The shared data management system as claimed in claim 1, wherein the memory system comprises at least one dedicated memory area associated with a data producer device, the data stored in a given memory area comprising the data produced by the producer device associated with said dedicated memory area.

15. A shared data management method implemented in a shared data management system for receiving frames comprising data from one or more producer devices and for transmitting reconstructed frames to one or more consumer devices, a producer device and a consumer device being connected to the shared data management system by way of a communication network using a communication protocol, the shared data management system comprising a memory system comprising a plurality of separate memories forming a space of shared addresses, wherein the method comprises:
- a step of storing at least some of the data encapsulated in a frame received from a producer device in a target memory of the memory system, one or more samples of a same datum being sent by the producer device, each sample of datum being associated with an index corresponding to a time of sending the sample, the indexes being incremented as a function of the date at which the sample is sent by the producer device; and
- the method furthermore comprising a step of computing, for each datum to be stored, the address of the target memory based on the sample index associated with the datum in the received frame, determining whether the datum is valid using data information stored in configuration tables, and storing the datum in the address of the target memory.

* * * * *

UNITED STATES PATENT AND TRADEMARK OFFICE
CERTIFICATE OF CORRECTION

| | |
|---|---|
| PATENT NO. | : 11,902,370 B2 |
| APPLICATION NO. | : 17/777273 |
| DATED | : February 13, 2024 |
| INVENTOR(S) | : Hana Krichene et al. |

It is certified that error appears in the above-identified patent and that said Letters Patent is hereby corrected as shown below:

In the Claims

In Claim 15, Column 20, Line 63, "data information stored in configuration tables," should be -- data information from the received frame or stored in configuration tables, --.

Signed and Sealed this
Twenty-third Day of April, 2024

Katherine Kelly Vidal
Director of the United States Patent and Trademark Office